United States Patent
Pang et al.

(10) Patent No.: US 12,273,798 B2
(45) Date of Patent: Apr. 8, 2025

(54) "ONE-TOUCH CALL" PLATFORM BASED ON A MOBILE INTELLIGENT TERMINAL AND THE IMPLEMENTING METHOD THEREFOR

(71) Applicant: GUANGDONG BANACH BIG DATA TECHNOLOGY CO., LTD., Guangzhou (CN)

(72) Inventors: Sulin Pang, Guangzhou (GD); Zhijian Li, Guangzhou (CN)

(73) Assignee: Guangdong Banach Big Data Technology Co., Ltd., Guangzhou (CN)

( * ) Notice: Subject to any disclaimer, the term of this patent is extended or adjusted under 35 U.S.C. 154(b) by 346 days.

(21) Appl. No.: 17/624,361

(22) PCT Filed: Oct. 25, 2019

(86) PCT No.: PCT/CN2019/113212
§ 371 (c)(1),
(2) Date: Jan. 3, 2022

(87) PCT Pub. No.: WO2021/000461
PCT Pub. Date: Jan. 7, 2021

(65) Prior Publication Data
US 2022/0377521 A1  Nov. 24, 2022

(30) Foreign Application Priority Data

Jul. 3, 2019 (CN) .......................... 201910592832.X

(51) Int. Cl.
*H04W 4/90* (2018.01)
*H04M 1/72424* (2021.01)
(Continued)

(52) U.S. Cl.
CPC ......... *H04W 4/90* (2018.02); *H04M 1/72424* (2021.01); *H04W 4/021* (2013.01); *H04W 4/14* (2013.01)

(58) Field of Classification Search
None
See application file for complete search history.

(56) References Cited

U.S. PATENT DOCUMENTS 6,038,440 A * 3/2000 Wu ..................... H04W 12/126
455/410
9,374,673 B2 * 6/2016 Mendelson .......... G01C 21/206
(Continued)

FOREIGN PATENT DOCUMENTS

CN   101076197 A   11/2007
CN   102572687 A   7/2012
(Continued)

OTHER PUBLICATIONS

International Search Report dated Mar. 12, 2020, Application No. PCT/CN2019/113212.

*Primary Examiner* — Kenneth B Wells
(74) *Attorney, Agent, or Firm* — The Dobrusin Law Firm, PC

(57) ABSTRACT

The invention discloses a one-touch call platform based on a mobile intelligent terminal and the implementing method therefor, the platform comprising a one-touch call from and to a local calling area module, a one-touch call from and to a remote calling area module and a message sending module; a user can click a button corresponding to an emergency rescue department's phone number, such as 110, 119, 120, 122, government emergency office, social commonweal organization and rescue company with number starting with 400, on the one-touch call platform through the mobile intelligent terminal. Then the platform will immediately obtain the user's location and identifier of the city the user (Continued)

is in from an electronic map and GPS, make an one-touch call to a target phone number, and automatically send the user's personal information (the person calling for alarm, and time, mobile number, address of the alarm) and location in a map to a preset emergency contact by a message. Through the method of this invention, a user can call a government emergency rescue department for help through the one-touch call platform, and automatically and simultaneously send his personal information and location in a map to a preset emergency contact by a message.

9 Claims, 5 Drawing Sheets

(51) Int. Cl.
*H04W 4/021* (2018.01)
*H04W 4/14* (2009.01)

(56) References Cited

U.S. PATENT DOCUMENTS

| | | | | |
|---|---|---|---|---|
| 9,961,708 | B1* | 5/2018 | Stair | H04W 76/16 |
| 2009/0280770 | A1* | 11/2009 | Mahendran | H04L 61/30 |
| | | | | 455/404.1 |
| 2012/0164968 | A1* | 6/2012 | Velusamy | H04W 4/027 |
| | | | | 455/404.2 |
| 2014/0378081 | A1* | 12/2014 | Xu | H04W 4/90 |
| | | | | 455/574 |
| 2015/0092619 | A1* | 4/2015 | Taylor | H04M 1/72418 |
| | | | | 370/271 |
| 2015/0223271 | A1* | 8/2015 | Penix | H04W 4/80 |
| | | | | 455/404.2 |
| 2017/0289350 | A1* | 10/2017 | Philbin | G08B 25/016 |
| 2018/0033288 | A1* | 2/2018 | Strack | G08B 25/016 |
| 2018/0213384 | A1* | 7/2018 | Youn | H04W 4/90 |
| 2019/0037451 | A1* | 1/2019 | Chaponniere | H04W 36/0022 |
| 2020/0285359 | A1* | 9/2020 | Coverstone | H04M 1/724092 |
| 2020/0390402 | A1* | 12/2020 | Fernando | A61B 5/01 |
| 2020/0404090 | A1* | 12/2020 | Cohen | H04M 3/5166 |

FOREIGN PATENT DOCUMENTS

| | | |
|---|---|---|
| CN | 102843641 A | 12/2012 |
| CN | 103428634 A | 12/2013 |
| CN | 105472085 A | 4/2016 |
| CN | 107911531 A | 4/2018 |

* cited by examiner

"ONE-TOUCH CALL" PLATFORM BASED ON A MOBILE INTELLIGENT TERMINAL AND THE IMPLEMENTING METHOD THEREFOR

TECHNICAL FIELD

The invention belongs to the technical field of emergency rescue, and particularly relates to a one-touch call platform based on a mobile intelligent terminal and the implementing method therefor.

BACKGROUND ART

At present, different cities and regions in China have different landline telephone area codes. If a user uses a local mobile phone to dial a local landline telephone number, it is not necessary to add an area code. However, when a user roams to other places, whether they dial a fixed landline phone number of the roaming city or dial a fixed landline phone number of the place where the mobile phone is registered, they need to add the area code. Yet in the past ten years, China has achieved that when a user call a government emergency rescue department, such as 110 (Public Security System), 119 (Fire Alarm System), 120 (Medical Care System), 122 (Traffic System), and the national toll-free hotline which starts with 400, no matter which city or region the user's mobile phone is registered, and no matter which city or region he is currently roaming, he can directly call the government emergency rescue department of the current roaming city or region such as 110, 119, 120, 122, and phone number starts with 400 without adding the area code.

At present, when using a roaming mobile phone to call 110, 119, 120, 122, other government emergency rescue departments and the national toll-free hotline starts with 400 in China (actually the whole world), although there is no need to add the area code, it is still necessary to enter the number through mobile phone number buttons one by one and press the "Dial" button, and then call 110, 119, 120, 122 and 400. However in an emergency case, for example: ① For a person who is being chased by a gangster behind him or a gangster who comes from the front side for killing, if he wants to call 110, it would be too late for him to take out his mobile phone and enter 110 one number by one on the mobile phone: ② For an old man with long-term cardio-vascular disease, if he experiences a heart attack or faints due to high blood pressure on the ground, it is impossible for him to input 120 one number by one and dial it on the mobile phone: ③ For a person who suddenly saw that the building where he lives was on fire and the smoke was rising, at the time he needed to escape immediately, it would be too late for him to take out his mobile phone, enter 119 one number by one and dial it on the mobile phone: ④ For a seriously injured person in a major traffic accident, he may miss the golden 2 hour life-saving opportunity if he took out the mobile phone in the blood, entered 120 one number by one and dialed it on the mobile phone . . . . Therefore, it is extremely important to study how to achieve one-touch call of 110, 119, 120, 122 and other government rescue departments on a mobile intelligent terminal, so that the one in need can take out his mobile phone and touch a preset button on the phone to call 110, 119, 120, 122 and other government rescue departments when he experiences extreme risks.

SUMMARY OF THE INVENTION

The main purpose of the invention is to overcome the shortcomings of the prior art, and to provide a one-touch call platform based on a mobile intelligent terminal and the implementing method therefor, thereby achieving the function of one-touch call and one-touch sending message by a mobile terminal at the same time.

In order to achieve the above object, this invention adopts the following technical solutions:

A one-touch call platform based on a mobile intelligent terminal provided by the invention comprises a one-touch call from and to a local calling area module, a one-touch call from and to a remote calling area module and a message sending module; wherein the one-touch call from and to a local calling area module is configured to call an emergency rescue department of the local calling area correspondingly by a function button of a one-touch call platform on the mobile intelligent terminal after the mobile intelligent terminal receives a trigger instruction of the one-touch call, when the mobile phone associated with the mobile intelligent terminal is registered in the local calling area;

the one-touch call from and to a remote calling area module is configured to call an emergency rescue department of the remote calling area correspondingly by the function button of the one-touch call platform on the mobile intelligent terminal after the mobile intelligent terminal receives a trigger instruction of the one-touch call, when the mobile phone associated with the mobile intelligent terminal is registered in the local calling area, and the user thereof roams to the remote calling area; and the message sending module is configured to automatically and simultaneously send a message to a contact when the one-touch call platform on the mobile intelligent terminal makes the call.

Preferably, the one-touch call from and to a local calling area module is configured by multi-layer mapping, wherein:

given that there are S buttons corresponding to various emergency rescue departments' telephone numbers on the one-touch call platform: $G_{i1}, G_{i2}, G_{i3}, G_{i4}, G_{i5}, G_{i6}, G_{i7}, \ldots G_{iS}$, when a user $B_{n_j}(t)$ calls a local emergency rescue department of the city $G_i$ where the user registers the mobile intelligent terminal, that is, the user $B_{n_j}(t)$ clicks the button $G_{i1}, G_{i2}, G_{i3}, G_{i4}, G_{i5}, G_{i6}, G_{i7}, \ldots, G_{iS}$ of the one-touch call platform on the mobile intelligent terminal to achieve one-touch call, and the mapping relationship of the established mathematical function $f_k$ is:

$$f_k: t \to B_{n_j}(t) \to G_{ik} \to \text{the phone number corresponding to number } k$$

wherein, $f_k$ is multi-layer mapping, k=1, 2, 3, 4, 5, 6, 7, . . . , S.

Preferably, the one-touch call from and to a local calling area module is configured by a polysemy function, wherein:

when a user $B_{n_j}(t)$ calls a local emergency rescue department of the city $G_i$ where the user registers the mobile intelligent terminal, that is, the user $B_{n_j}(t)$ clicks the button $G_{i1}, G_{i2}, G_{i3}, G_{i4}, G_{i5}, G_{i6}, G_{i7}, \ldots G_{iS}$ of the one-touch call platform on the mobile intelligent terminal to achieve one-touch call, the mapping relationship of the established polysemy function $f_k$ is:

$$f_k: t \to B_{n_j}(t) \to G_{ik} \to \text{the phone number corresponding to number } k$$

wherein, $f_k$ is the polysemy function, k=1, 2, 3, 4, 5, 6, 7, . . . , S.

Preferably, the one-touch call from and to a remote calling area module is configured by a polysemy function, wherein:

the polysemy function $f_k(t)$ is:

$$f_k(t): B_{n_i}(t) \rightarrow G_{ik} \rightarrow m_j + \text{the phone number corresponding to number } k$$

wherein, k=1, 2, 3, 4, 5, 6, 7, ..., M, $G_j$, refers to calling the $k^{th}$ emergency rescue department of a remote area $G_j$ from the city $G_i$ where the user registers the mobile intelligent terminal.

Preferably, the message sending module comprises a contact setup module, an automatically and simultaneously sending message from a local number module, and an automatically and simultaneously sending message from a remote number module; wherein the contact setup module is configured to preset the contact and add information of the contact, the information of the contact comprising a name, a relationship and a mobile phone number:

the automatically and simultaneously sending message from a local number module is configured to send personal information and location to the preset contact in a message by the platform automatically and simultaneously when a one-touch call is made to call an emergency rescue department of a local area $G_i$ by a function button of the one-touch call platform on a mobile intelligent terminal $C_{n_i}(t)$ associated with the mobile phone registered in the city $G_i$, the personal information comprising the the person calling for alarm, and time, mobile phone number and address of the alarm;

the automatically and simultaneously sending message from a remote number module is configured to send personal information and location to the preset contact in a message by the platform automatically and simultaneously when a remote one-touch call is made by a function button of the one-touch call platform on the mobile intelligent terminal $C_{n_i}(t)$ associated with the mobile phone registered in the city $G_i$ after roaming to a remote area $G_j$, the personal information comprising the the person calling for alarm, and time, mobile phone number and address of the alarm.

Preferably, when the automatically and simultaneously sending message from a local number module and the automatically and simultaneously sending message from a remote number module send a message:

given that a user $B_{n_i}(t)$ selects a function button $G_{ik}$, k=1, 2, 3, 4, 5, 6, 7, ..., M on the one-touch call platform, ① if j=i, the user makes a one-touch call to an emergency rescue department in the local area $G_i$ by the one-touch call platform, and the backend of the one-touch call platform sends a message to the contact through the automatically and simultaneously sending message from a local number module utilizing a mapping function between the one-touch call from and to a local calling area module and the phone number of the emergency rescue department, wherein the personal information and the location of the user are sent to the preset contact in a message simultaneously when the one-touch call to the local emergency rescue department $G_i$ is made;

② if j≠i, i, j=1, 2, ..., N, the user makes a one-touch call to an emergency rescue department of the remote area $G_j$ by the one-touch call platform, and the backend of the one-touch call platform sends a message to the contact through the automatically and simultaneously sending message from a remote number module utilizing a mapping function between the one-touch call from and to a remote calling area module and the phone number of the emergency rescue department, wherein the personal information and the location of the user are sent to the preset contact in a message simultaneously when the one-touch call to the remote emergency rescue department $G_j$ is made.

A method for implementing the one-touch call platform based on a mobile intelligent terminal is further provided by the invention, comprising the following steps:

automatically reading an electronic map by the mobile intelligent terminal to obtain the current location of the user and a real-time map, the user's name, mobile phone number and location being saved in the backend memory;

automatically reading GPS by the mobile intelligent terminal to obtain the administrative area code of the current location of the user;

converting the administrative area code into a corresponding area code by a backend data converter to obtain an identifier;

calling the identifier by a front-end data trigger and receiving the identifier by a front-end data receiver;

sending the identifier from the front-end data receiver to a backend data processor;

reading the current location of the user and the latitude and longitude of the real-time map by an electronic map data reading center through an electronic map interface;

combining the identifier and a preset emergency rescue landline telephone number of a button by the backend data processor;

calling a target number through the built-in telephone dialer in the backend system to realize one-touch call; and when one-touch call is made to the target number, sending the user's name, mobile phone number and location automatically to the contact preset in the one-touch call platform by a message.

Preferably, the backend memory comprises a first backend memory and a second backend memory; wherein a backend data converter converts the administrative area code to the area code corresponding to the city (region), and saves the area code in the first backend memory;

the electronic map data reading center saves the current location of the user and the latitude and longitude of the real-time map in the second backend memory.

Preferably, the method further comprises the following two steps when one-touch call is made to the target number:

the first step is as follows:

when a first front-end data receiver receives the preset phone number of the button, transmitting the preset phone number to the first backend data processor;

after a first front-end data trigger is triggered, notifying a first backend data caller to call the area code in the first backend memory by the first front-end data trigger;

transmitting the area code to the first backend memory by the first backend data caller;

after the first backend memory contains both the city or regional area code and the preset phone number of the button, combining the area code and the preset phone number to form an "area code+phone number";

transmitting the "area code+phone number" to the telephone dialer by the backend memory;

dialing the "area code+phone number" through one-touch call by the telephone dialer; and the second step is as follows:

after a second front-end data trigger is triggered, notifying a second backend data caller to call the user's name and mobile phone number in the first backend memory, and simultaneously call the current location of the user and the latitude and longitude of the real-time map in the second backend memory;

sending the user's name, mobile phone number, and current location, latitude and longitude of the real-time map and the real-time map to the message sending module by the second backend data caller;

sending the user's name, mobile phone number, and current location, computer system time, latitude and longitude of the real-time map and the real-time map to the emergency contact by the message sending module.

Preferably, the user may click any one button corresponding to an emergency rescue department's phone number displayed on the one-touch call platform according to the user's need.

Compared with the prior art, the present invention has the following advantages and beneficial effects:

The invention can achieve that no matter where the user's mobile phone is registered, and no matter where the user is when he is calling, when the user calls a local government emergency rescue department or the emergency rescue system at the most urgent moment, such as 110 (Public Security Alarm System), 119 (Fire Alarm System), 120 (Medical Care System), 122 (Traffic System), numbers of government emergency offices, numbers of social rescue organizations, and numbers of rescue companies starting with 400, etc., the user doesn't need to enter the numbers of these emergency rescue departments one by one on the phone slowly and dial it. Instead, just log in the "one-touch call" platform, and he can directly click the button corresponding to 110, 119, 120, 122, numbers of government emergency offices, numbers of social rescue organizations, and numbers of rescue companies starting with 400 and other emergency rescue numbers and make a one-touch call to these local government emergency rescue departments, so that the user can call the local government emergency rescue departments as fast as possible, ask them for help, and automatically send the user's personal information (the the person calling for alarm, and time, mobile number, address of the alarm) and location in a map to a preset emergency contact person by a message.

DETAILED DESCRIPTION OF THE EMBODIMENTS

The invention will be further described in detail below with reference to the embodiments and drawings, but the embodiments of the invention are not limited to this.

Embodiment

Figure 6:
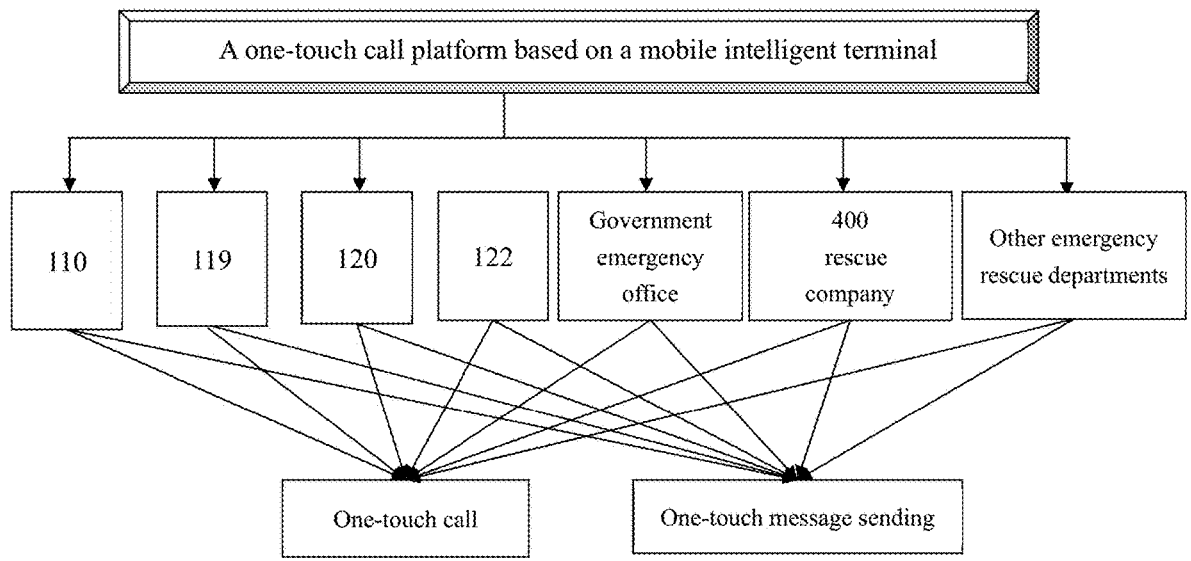
FIG. 6 is a functional architecture diagram of the "one-touch call" platform system of the invention.

A one-touch call platform based on a mobile intelligent terminal of the embodiment mainly achieves that wherever a user is, he can click the function button corresponding to 110 (public security), 119 (fire alarm), 120 (medical care), 122 (traffic), government emergency offices, social rescue organizations, rescue companies with number starting with 400, . . . , and other emergency rescue departments, on the one-touch call platform of a mobile intelligent terminal, and call the corresponding emergency rescue department. In addition, in the subsystem modules of each emergency rescue department, there are two subfunction modules including one-touch call and "one-touch message sending". The function architecture of the "one-touch call" platform based on a mobile intelligent terminal is shown in FIG. 6.

The one-touch call platform based on a mobile intelligent terminal mainly achieves that a user may use a mobile intelligent terminal and click a function button corresponding to 110 (public security), 119 (fire alarm), 120 (medical care), 122 (traffic), government emergency offices, social rescue organizations, rescue companies with numbers starting with 400, . . . , and other emergency rescue departments in any city or region of the country The system structure of the "one-touch call" platform of the invention includes two sub-architectures comprising a one-touch call sub-architecture and one-touch message sending sub-architecture, which are further explained below:

For the one-touch call sub-architecture, specifically:

No matter in which city a user registers his mobile phone (Mobile, Unicom or Telecom), no matter which city or place he is in when he encounters an emergency case, he only needs to open his mobile intelligent terminal and clicks a function button on the platform corresponding to 110 (public security), 119 (fire alarm), 120 (medical care), 122 (traffic), government emergency offices, social rescue organization, rescue companies with numbers starting with 400, . . . , and other emergency rescue departments, and these emergency rescue departments may be called through one touch.

In practical applications, "the city's area code+emergency rescue department's phone number" may pop up when calling, and two system reminders: "confirm call" or "give up" may appear at the same time due to requirements from Apple or Android system. At this time, if a user clicks "confirm call", the selected emergency department may be directly called. In general, different mobile phone manufacturers have different system requirements. Some can make calls with one button, while others need to confirm if to call or give up in a small popped up window: In addition, the "one-touch call" platform based on an APP may generally make a one-touch call to these emergency rescue departments. However, if the "one-touch call" platform is developed by H5, it will be affected by WeChat. Sometimes because WeChat changes, small windows may pop up to ask for confirmation to call or give up.

For the one-touch message sending sub-architecture, specifically:

The "one-touch call" platform provides buttons corresponding to the emergency rescue departments' telephone numbers: 110 (public security), 119 (fire alarm), 120 (medical care), 122 (traffic), government emergency offices, social rescue organization, rescue companies with numbers starting with 400, . . . , and other emergency rescue departments, etc. Users can click these buttons on the one-touch call platform and one-touch call to the emergency departments may be achieved. Also, a user's personal information (the person calling for alarm, and time, mobile phone number, address of the alarm) and his location in a map are sent to the preset contact by a message at the same time.

Figure 7:
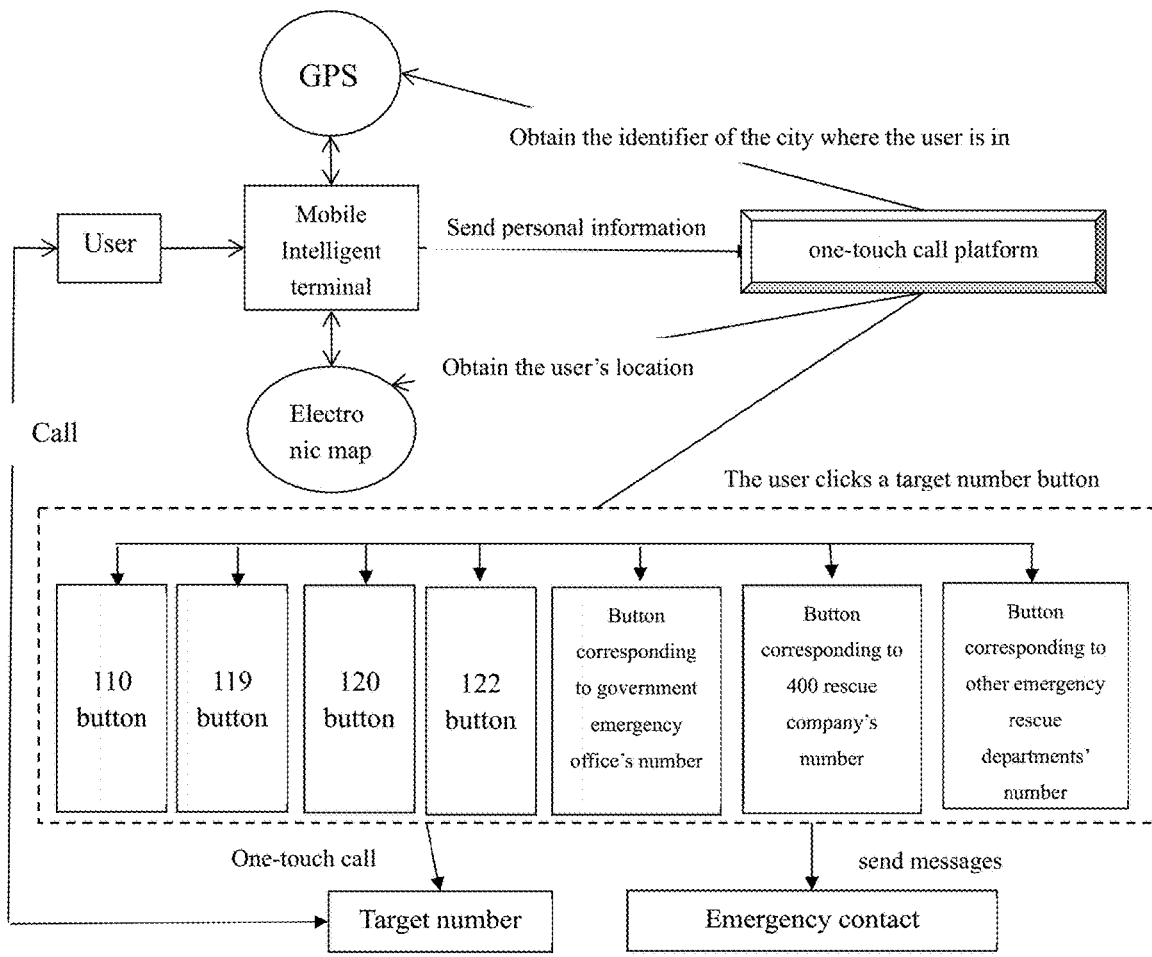
FIG. 7 is a schematic diagram of the working principle of the "one-touch call" platform of the invention.

The "one-touch call" platform works as follows: a user clicks a button corresponding to a target phone number on the "one-touch call" platform of the mobile intelligent terminal, such as 110 (public security), 119 (fire alarm), 120 (medical care), 122 (traffic), government emergency offices, social rescue organizations, rescue companies with numbers starting with 400, . . . , and other emergency rescue departments, etc., and the platform will immediately obtain the user's personal information (user name and mobile phone number), location and identifier (city area code or administrative area code) of the city where the user is in from his mobile intelligent terminal, an electronic map and GPS through the mobile intelligent terminal, respectively save them to a first backend data memory, a second backend memory, and the first backend memory, so as to immediately make a one-touch call to the emergency rescue department's target phone number. Meanwhile, the platform automatically sends the user's personal information (the person calling for alarm, and time, mobile phone number, and address of the alarm) and location in a map to the preset contact by a message. The working principle of the platform is shown in FIG. 7.

A one-touch call platform based on a mobile intelligent terminal provided by the embodiment comprises a one-touch call from and to a local calling area module, a one-touch call from and to a remote calling area module and a message sending module; wherein the one-touch call from and to a local calling area module is configured to call an emergency rescue department of the local calling area correspondingly by a function button of a one-touch call platform on the mobile intelligent terminal after the mobile intelligent terminal receives a trigger instruction of the one-touch call, when the mobile phone associated with the mobile intelligent terminal is registered in the local calling area;

the one-touch call from and to a remote calling area module is configured to call an emergency rescue department of the remote calling area correspondingly by the function button of the one-touch call platform on the mobile intelligent terminal after the mobile intelligent terminal receives a trigger instruction of the one-touch call, when the mobile phone associated with the mobile intelligent terminal is registered in the local calling area, and the user thereof roams to the remote calling area; and the message sending module is configured to automatically and simultaneously send a message to a contact when the one-touch call platform on the mobile intelligent terminal makes the call.

The "one-touch call" platform of the invention can realize one-touch call from and to a local calling area and one-touch call from and to a remote calling area.

Given that China has N different cities (including regions and municipalities, the same below), respectively: $G_1$, $G_2$, . . . , $G_N$, the N different cities having clear regional boundaries in GPS, and the areas enclosed by the boundaries of different cities is an empty set, which is $$\bigcap_{i=1}^{N} G_i = \Phi.$$

Each city has a unique area code and administrative area code, and different cities have different area codes and administrative area codes. Therefore, the invention uses a city's area code or administrative area code as the city's unique identifier.

Figure 1:
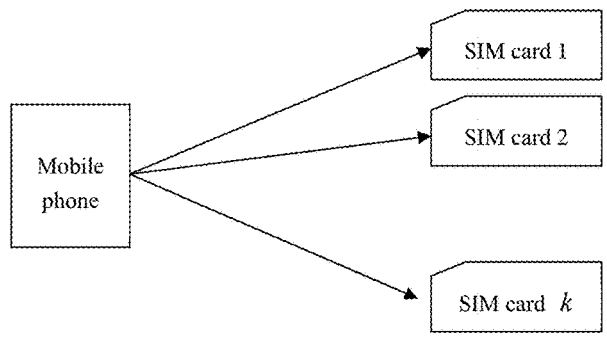
FIG. 1 is a schematic diagram of a multi-card mobile phone.

Given that the unique identifier of a city $G_i$ (i=1, 2, . . . , N, the same below) is $m_i$, the unique identifiers corresponding to different N cities in China $G_1, G_2, \ldots, G_N$ are $m_1, m_2, \ldots, m_N$. People usually use mobile phones equipped with multiple SIM cards (the mentioned SIM card refers to SIM card of China Mobile or China Telecom, the same below), that is, a multi-card case. As shown in FIG. 1, a mobile phone is equipped with k SIM cards, which is theoretically possible.

Figure 2:
FIG. 2 shows one-to-one relationship between a mobile phone call and a SIM card.

On the contrary, each SIM card uniquely corresponds to one mobile phone, that is, one card in one phone. A mobile phone can only make a call through one SIM card for each time, so a mobile phone call also uniquely corresponds to one SIM card. Therefore, there is a one-to-one correspondence between a mobile phone call and a SIM card, as shown in FIG. 2.

Therefore, on a mobile intelligent terminal, we preset buttons corresponding to "110", "119", "120", "122", numbers of government emergency offices, numbers of social rescue organizations, numbers of rescue companies starting with "400" and numbers of other emergency rescue companies, etc., which are called as "numbers of emergency rescue departments" below. On a mobile intelligent terminal, a user can simply click a preset button corresponding to a "number of emergency rescue department", the emergency rescue department corresponding to the button can be called by one touch.

Figure 3:
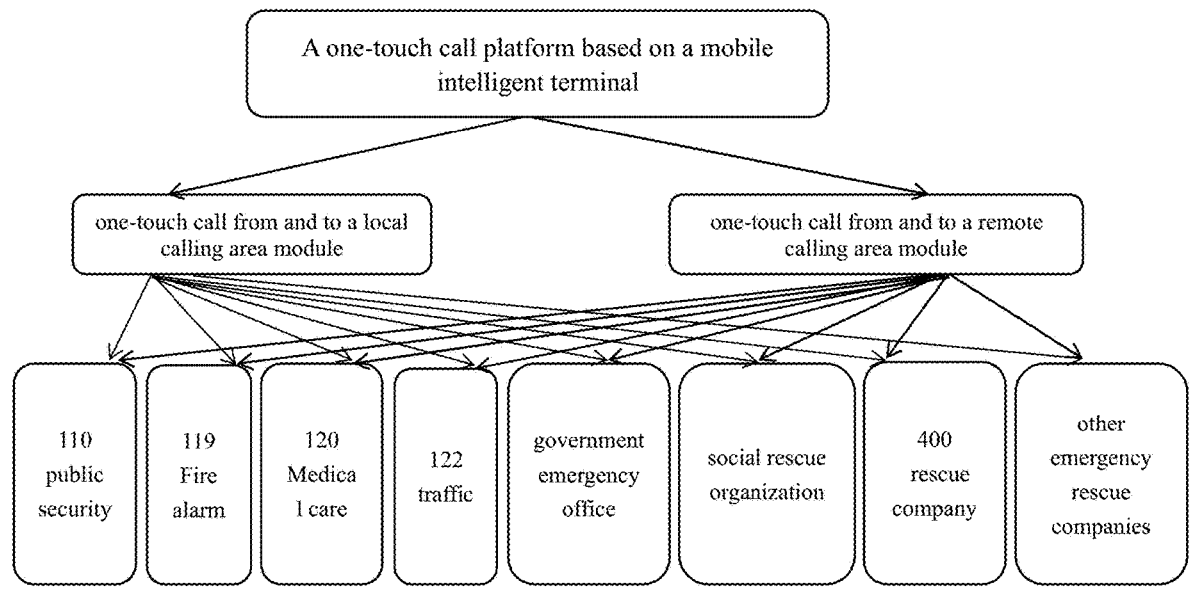
FIG. 3 is a diagram of two "one-touch call" architectures based on a mobile intelligent terminal.

Then, there are two situations of the "one-touch call" based on a mobile intelligent terminal: ① one-touch call from and to a local calling area, which means that the mobile phone associated with the mobile intelligent terminal is registered in the local calling area, and the one-touch call is made to a local emergency rescue department: ② one-touch call from and to a remote calling area, which means that the mobile phone associated with the mobile intelligent terminal is registered in another calling area, and the one-touch call is made to an emergency department of the remote calling area. The two "one-touch call" situations are shown in FIG. 3.

Also, the invention numbers the "numbers of emergency rescue department" including "110", "119", "120", "122", numbers of government emergency offices, numbers of social rescue organizations, numbers of rescue companies starting with "400" and numbers of other emergency rescue companies as: 1, 2, 3, 4, 5, 6, 7, . . . , S, wherein the ellipsis indicates that any emergency rescue department of government, an organization, and a company can be added (the same below).

According to the design principle of the "one-touch call" platform, the map function principle of the "one-touch call" platform based on a mobile intelligent terminal is as follows:

Given that at the moment t, a city $G_i$ has $n_i(t)$ registered mobile phones. $C_{n_i}(t)$ is used to represent the $n_i(t)$ registered mobile phone and all the mobile intelligent terminals associated with the mobile phone, which is called a mobile intelligent terminal $C_{n_i}(t)$ The user corresponding to the mobile intelligent terminal is $B_{n_i}(t)$. Therefore, in the current situation, for the user $B_{n_i}(t)$ to dial 110 (public security alarm system), 119 (fire alarm system), 120 (medical care system), 122 (traffic system), numbers of government emergency offices, numbers of social rescue organizations, numbers of rescue companies starting with "400", etc., function buttons corresponding to these emergency rescue departments are assigned as $G_{i1}$ (110 public security system button), $G_{i2}$ (119 fire alarm system button), $G_{i3}$ (120 medical care system button), $G_{i4}$ (122 traffic system button), $G_{i5}$ (government emergency office button), $G_{i6}$ (social rescue organization button), $G_{i7}$ (rescue companies starting with "400" button), ..., $G_{iS}$ (other emergency rescue buttons). Two map function relationships of the "one-touch call" based on a mobile intelligent terminal are as follows:

"one-touch call from and to a local calling area" means that the mobile phone (the mobile phone is also treated as a mobile intelligent terminal) associated with the mobile intelligent terminal is registered in the local calling area, and a user makes a one-touch call to a local emergency rescue department by a function button of the one-touch call platform on a mobile intelligent terminal.

(1) Multi-Layer Mapping

Suppose a user $B_{n_i}(t)$ dials 110 (Public Security System), 119 (Fire Alarm System), 120 (Medical Care System), 122 (Traffic System), numbers of government emergency offices, numbers of social rescue organizations, numbers of rescue companies starting with "400" and numbers of other emergency rescue companies, etc., of the city where he registered his mobile phone, $G_i$, that is, the user $B_{n_i}(t)$ click one of the buttons $G_{i1}$, $G_{i2}$, $G_{i3}$, $G_{i4}$, $G_{i5}$, $G_{i6}$, $G_{i7}$ ... $G_{iS}$, etc. for one-touch call on the "one-touch call" platform of the mobile intelligent terminal, the mapping relationship of the established function $f_k$(k=1, 2, 3, 4, 5, 6, 7, ..., S, the same below) is:

$$f_k: t \to B_{n_i}(t) \to C_{ik} \to \text{phone number corresponding to number } k \quad (1)$$

wherein, $f_k$ is called ($k^{th}$) multi-layer mapping.

Definition 1 (multi-layer mapping): From a certain moment t, an event or data corresponds to the next associated event or associated data. Then the current event or data further corresponds to the next new associated event or new associated data. Similarly, the correspondence of events and data continues layer by layer until there are no new associated events and associated data. This correspondence f is called multi-layer mapping.

In formula (1), the multi-layer mapping $f_k$ has four layers. Thus, the mapping relationship of the four-layer mapping $f_k$(k=1, 2, 3, 4, 5, 6, 7, ..., S) of the "one-touch call" platform is as follows:

In equations (2)-(9), the multi-layer mapping $f_k$ starts from time t. It firstly corresponds to the user $B_{n_i}(t)$, then corresponds to the function button $G_{ik}$ on the "one-touch call" platform, and finally corresponds to the phone number with number k. There are four layers of mapping.

Attention: Since the data types associated with the multi-layer mapping can be different from each other, the multi-layer mapping cannot be represented by a mathematical composite function.

(2) Polysemy Function

The multi-layer mapping (1) can also be expressed in the form of a function as follows:

$$f_k(t): B_{n_i}(t) \to G_{ik} \to \text{phone number corresponding to number } k \quad (10)$$

wherein, $f_k(t)$ is called the ($k^{th}$) polysemy function.

Definition 2 (polysemy function): An event or data occurring from a certain moment t causes another associated event or associated data to occur under the action of function f. Then it continues to cause the next new associated event or new associated data to occur under the action of function f. Similarly, the correspondence of events and data continues layer by layer until the final associated event or associated data. This function f(t) is called polysemy function. t is called an independent variable or a time variable.

For example in equation (1), the polysemy function f(t) has a value of user $B_{n_i}(t)$ at time t. Then the value becomes the function button $G_{ik}$ on the "one-touch call" platform. Finally the value becomes the phone number with number k. There are three different values, indicating three events with different meanings at time t.

In this invention, when the function f(t) is a polysemy function, the data types of independent variables t at different events or different values may be different. In other words, the value of the polysemous function f(t) may be a number at a certain layer, a character in the next layer, an object in the next layer X, and so on. In a specific case, the corresponding polysemy function f(t) is established according to the correlation of the actual data at time t.

In equation (10), the polysemy function $f_k(t)$ has three values: user, function button and telephone number. Thus, the correlation of the polysemy function $f_k(t)$ (k=1, 2, 3, 4, 5, 6, 7, ..., S) of the "one-touch call" platform is as follows:

| Multi-layer mapping | Time | User | One-touch call button | Phone number | |
|---|---|---|---|---|---|
| $f_1$: | t → | $B_{n_i}(t)$ → | $G_{i1}$ → | 110 | (2) |
| $f_2$: | t → | $B_{n_i}(t)$ → | $G_{i2}$ → | 119 | (3) |
| $f_3$: | t → | $B_{n_i}(t)$ → | $G_{i3}$ → | 120 | (4) |
| $f_4$: | t → | $B_{n_i}(t)$ → | $G_{i4}$ → | 122 | (5) |
| $f_5$: | t → | $B_{n_i}(t)$ → | $G_{i5}$ → | phone number government emergency office | (6) |
| $f_6$: | t → | $B_{n_i}(t)$ → | $G_{i6}$ → | phone number of social rescue organization | (7) |
| $f_7$: | t → | $B_{n_i}(t)$ → | $G_{i7}$ → | rescue companies' phone numbers starting with 400 | (8) |
| ... | | | | | |
| $f_S$: | t → | $B_{n_i}(t)$ → | $G_{iS}$ → | other emergency rescue phone number | (9) |

| Polysemy function | User | One-touch call button | Phone number | |
|---|---|---|---|---|
| | $f_1(t): B_{n_i}(t) \to G_{i1} \to$ | 110 | | (11) |
| | $f_2(t): B_{n_i}(t) \to G_{i2} \to$ | 119 | | (12) |
| | $f_3(t): B_{n_i}(t) \to G_{i3} \to$ | 120 | | (13) |
| | $f_4(t): B_{n_i}(t) \to G_{i4} \to$ | 122 | | (14) |
| $f_5(t): B_{n_i}(t) \to G_{i5} \to$ phone number government emergency office | | | | (15) |
| $f_6(t): B_{n_i}(t) \to G_{i6} \to$ phone number of social rescue organization | | | | (16) |
| $f_7(t): B_{n_i}(t) \to G_{i7} \to$ rescue companies' phone numbers starting with 400 | | | | (17) |
| ... | | | | |
| $f_S(t): B_{n_i}(t) \to G_{iS} \to$ other emergency rescue phone number | | | | (18) |

In particular, the polysemy function actually means that the function has multiple values and has different meanings at different stages.

It is known from equations (1) and (10) that for the same event, the multi-layer mapping and the polysemy function are the same in operation execution and the generated events or data. The difference is that the multi-layer mapping reflects the correspondence between events, while the polysemy function reflects the interaction between events.

the remote area $G_j$. The polysemy function established (the same below) has a relationship as follows:

$$f_k(t): B_{n_i}(t) \to G_{ik} \to m_j + \text{number } k \text{ corresponding phone number} \quad (19)$$

Wherein, $G_{jk}$ refers to that a call is made from the city $G_i$ in which the mobile phone associated with the mobile intelligent terminal is registered to the $k^{th}$ emergency rescue department of the remote area $G_j$. The polysemy function of the "one-touch call" has the following specific relationship:

| Polysemy function | User | One-touch call button | Phone number | |
|---|---|---|---|---|
| | $f_1(t): B_{n_i}(t) \to G_{j1} \to$ | $m_j + 110$ | | (20) |
| | $f_2(t): B_{n_i}(t) \to G_{j2} \to$ | $m_j + 119$ | | (21) |
| | $f_3(t): B_{n_i}(t) \to G_{j3} \to$ | $m_j + 120$ | | (22) |
| | $f_4(t): B_{n_i}(t) \to G_{j4} \to$ | $m_j + 122$ | | (23) |
| $f_5(t): B_{n_i}(t) \to G_{j5} \to m_j +$ phone number of government emergency office | | | | (24) |
| $f_6(t): B_{n_i}(t) \to G_{j6} \to m_j +$ phone number of social rescue organization | | | | (25) |
| $f_7(t): B_{n_i}(t) \to G_{j7} \to$ rescue companies' phone numbers starting with 400 | | | | (26) |
| ... | | | | |
| $f_S(t): B_{n_i}(t) \to G_{jS} \to m_j +$ other emergency rescue phone number | | | | (27) | one-touch call from and to a remote calling area means that a mobile phone associated with a mobile intelligent terminal (the mobile phone also acts as a mobile intelligent terminal) is locally registered, and when the user roams to the remote calling area and makes a phone call from the one-touch call platform on the mobile intelligent terminal to the corresponding emergency department located in the area he is in (i.e., the remote calling area). Assume that the user $B_{n_i}(t)$ registers his mobile phone in the city $G_i$, roams to another city $G_j$ in China ($j \neq i$, $j=1, 2 \ldots N$, the same below), and then dials 110 (Public Security System), 119 (Fire Alarm System), 120 (medical care), 122 (traffic system), numbers of government emergency offices, numbers of social rescue organizations, numbers of rescue companies starting with "400" and numbers of other emergency rescue companies, etc., of the city $G_j$, that is, the user $B_{n_i}(t)$ clicks the button $G_{j1}$, $G_{j2}$, $G_{j3}$, $G_{j4}$, $G_{j5}$, $G_{j6}$, $G_{j7}$, ... $G_{jS}$ on the "one-touch call" platform of the mobile intelligent terminal to make a one-touch call from and to the remote calling area. Because the phone number dialed at this time is the telephone number of the emergency rescue departments in the remote calling area, the backend system of the one-touch call platform must preset a unique identifier for the remote area $G_j$, such as the area code and administrative area code thereof. The city identifier can be a number or a character. Then, the one-touch call becomes: unique identifier+phone number, that is, $m_j+110$, $m_j+119$, $m_j+120$ or $m_j+122$, $m_j$+phone number of government emergency office, $m_j$+phone number of social rescue organization, rescue company's phone number starting with 400, ..., $m_j$+other emergency rescue number, etc., wherein, $m_j$ is a unique identifier ($j \neq i$, i, $j=1, 2, \ldots, N$) for The message sending module comprises a contact setup module, an automatically and simultaneously sending message from a local number module, and an automatically and simultaneously sending message from a remote number module; wherein the contact setup module is configured to preset the contact and add information of the contact, the information of the contact comprising a name, a relationship and a mobile phone number;

the automatically and simultaneously sending message from a local number module is configured to send personal information and location to the preset contact in a message by the platform automatically and simultaneously when a one-touch calling is made to call an emergency rescue department of a local area $G_i$ by a function button of the "one-touch calling" platform on a mobile intelligent terminal $C_{n_i}(t)$ associated with the mobile phone registered in the city $G_i$, the personal information comprising the person calling for alarm, and time, mobile phone number and address of the alarm;

the automatically and simultaneously sending message from a remote number module is configured to send personal information and location to the preset contact in a message by the platform automatically and simultaneously when a remote one-touch calling is made by a function button of the "one-touch calling" platform on the mobile intelligent terminal $C_{n_i}(t)$ associated with the mobile phone registered in the city $G_i$ after roaming to a remote area $G_j$, the personal information comprising the person calling for alarm, and time, mobile phone number and address of the alarm.

The "one-touch call" platform based on a mobile intelligent terminal will simultaneously achieve the function of making calls and sending messages. This requires the user to add names, relationships, and mobile numbers of his family and friends by the "add contact" of the "personal center" before using the one-touch call platform. The one-touch call platform does not set a limit on the number of mobile phone numbers of family and friends, that is, the user can add mobile phone numbers of family and friends as contacts at wills. In this way, when a sudden risk occurs, the user uses the function button that has been set in the one-touch call platform: $G_{i1}$ (110 public security), $G_{i2}$ (119 fire alarm), $G_{i3}$ (120 medical care), $G_{i4}$ (122 traffic), $G_{i5}$ (government emergency office), $G_{i6}$ (social rescue organization), $G_{i7}$ (rescue company with number starting with 400), . . . , $G_{iS}$ (other emergency rescue departments), etc., and clicks on any of these buttons to call a emergency rescue department of the local area $G_i$. Also, he can send a message to all the contacts with the user's personal information (the person calling for alarm, and time, mobile phone number and address of the alarm) and real-time location to the contacts by messages. Moreover, "one-touch alarm" may be achieved by one-touch call to "110".

In one embodiment, if the user clicks the function button $G_{i1}$ (110 public security) on the one-touch call platform, the user can not only make a one-touch alarm to the public security system 110, but also automatically sends the user's personal information (the person calling for alarm, and time, mobile phone number and address of the alarm) and real-time location to the preset contacts by messages from the platform. In another embodiment, if the user clicks the function button $G_{i3}$ (120 medical care) on the one-touch call platform, the user can not only make a one-touch alarm to the medical care system 120, but also automatically sends the user's personal information (the person calling for alarm, and time, mobile phone number and address of the alarm) and real-time location to the preset contacts by messages from the platform, etc.

Figure 4:
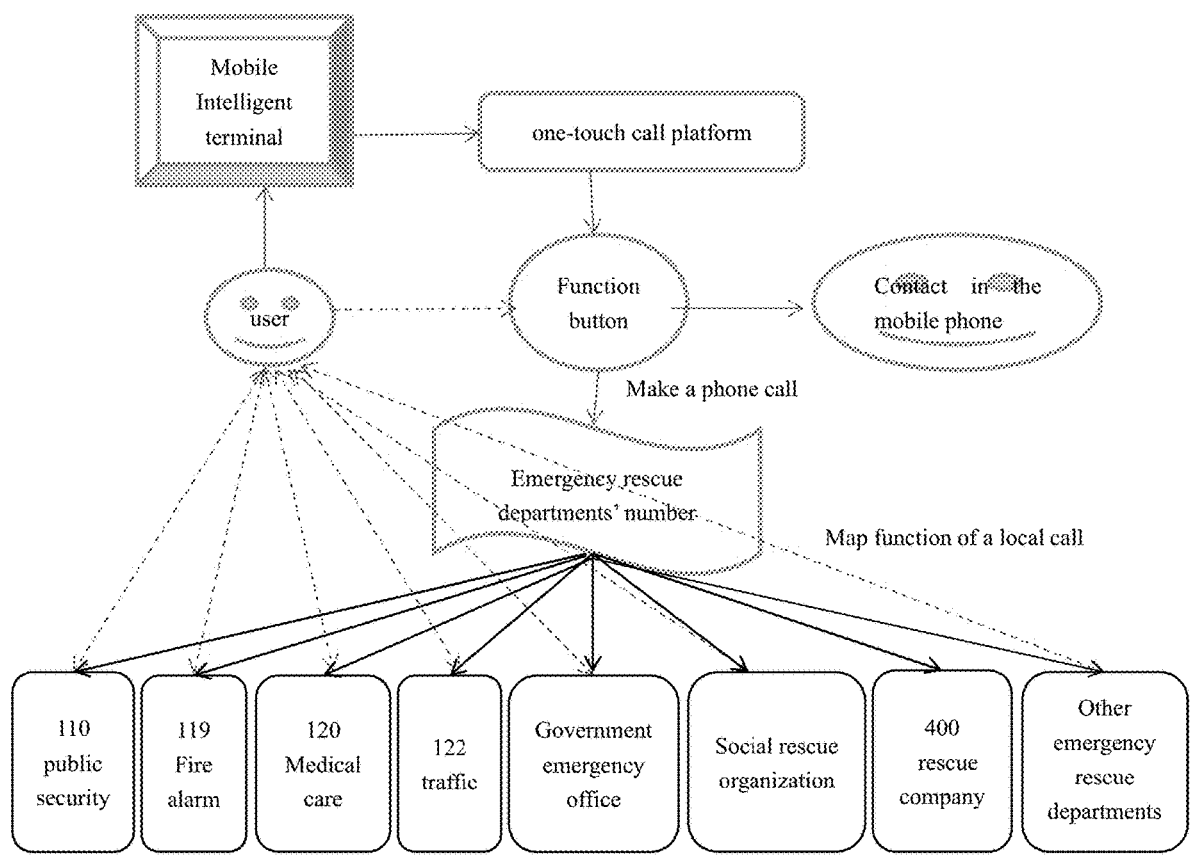
FIG. 4 is a schematic logic diagram of one-touch call to a local phone of the invention.

The design of the automatic message sending by the "one-touch call" includes the following two aspects:

(1) Design of Automatic Message Sending from a Local Number by the One-Touch Call When a user uses the function buttons $G_{i1}$, $G_{i2}$, $G_{i3}$, $G_{i4}$, $G_{i5}$, $G_{i6}$, $G_{i7}$, . . . , $G_{iS}$, etc. on the one-touch call platform of a mobile intelligent terminal (including the mobile phone) $C_{n_i}(t)$ associated with the mobile phone registered in the area $G_i$ (i=1, 2, . . . , N) to make a one-touch call to an emergency rescue department's telephone number in the local area $G_i$ such as 110 (public security), 119 (fire alarm), 120 (medical care), 122 (traffic), government emergency offices, social rescue organizations, rescue companies with numbers starting with 400, . . . , and other emergency rescue departments, etc., his personal information (the person calling for alarm, and time, mobile phone number and address of the alarm) and location in a map is sent to the preset contacts by messages. The logic principle of using the one-touch call platform to make a one-touch call to a local emergency rescue department is shown in FIG. 4.

Figure 5:
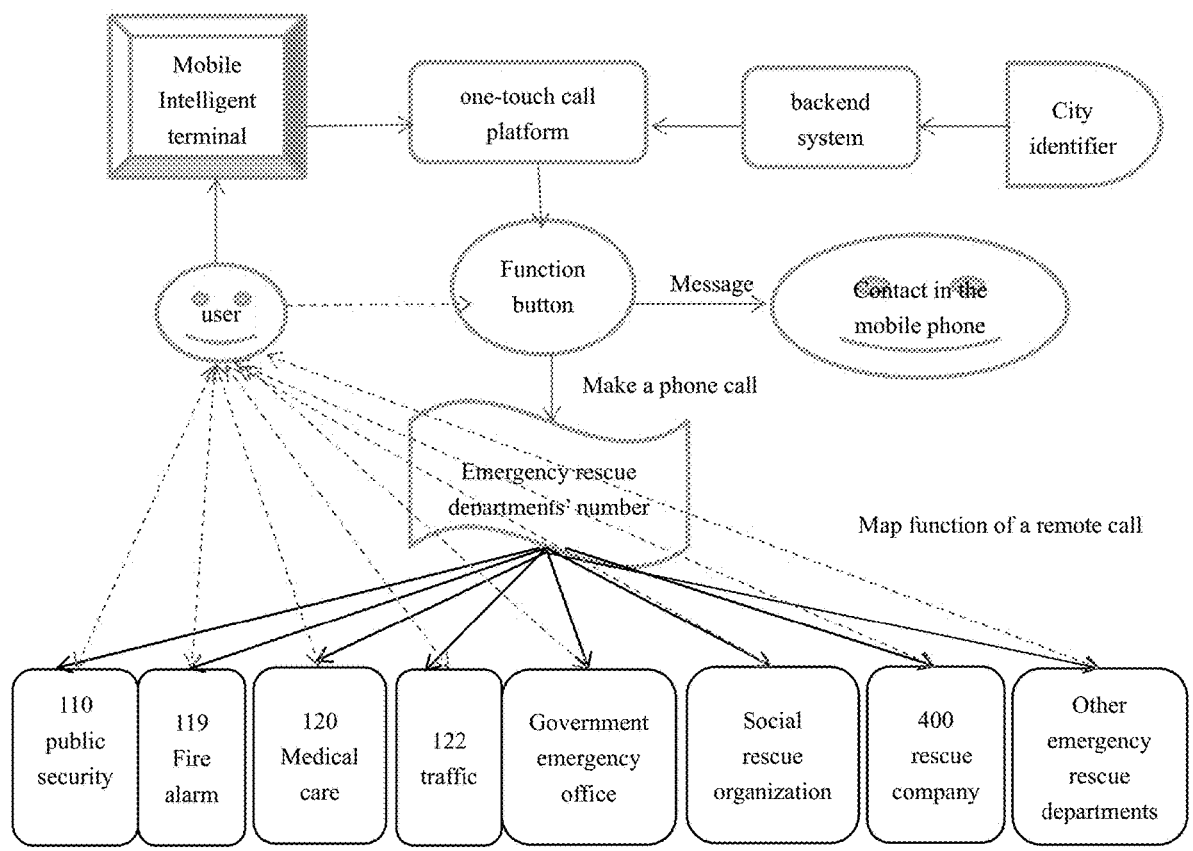
FIG. 5 is a schematic logic diagram of one-touch call to a remote phone of the invention.

(2) Design of Automatic Message Sending from a Remote Number by the One-Touch Call When a user roams to a remote area $G_j$ and uses the function buttons $G_{j1}$, $G_{j2}$, $G_{j3}$, $G_{j4}$, $G_{j5}$, $G_{j6}$, $G_{j7}$, . . . , $G_{jS}$, etc. on the one-touch call platform of a mobile intelligent terminal (including the mobile phone) $C_{n_i}(t)$ associated with the mobile phone registered in the area $G_i$ (i=1, 2, . . . , N) to make a remote one-touch call to an emergency rescue department's telephone number in the remote area such as 110 (public security), 119 (fire alarm), 120 (medical care), 122 (traffic), government emergency offices, social rescue organizations, rescue companies with numbers starting with 400, . . . , and other emergency rescue departments, etc., his personal information (the person calling for alarm, and time, mobile phone number and address of the alarm) and location in a map is sent to the preset contacts by messages. The logic principle of using the one-touch call platform to make a one-touch call to a remote emergency rescue department is shown in FIG. 5.

The algorithm of automatic message sending one-touch call is as follows:

Assume that at a certain moment t, the mobile phone user $B_{n_i}(t)$ who registers his mobile phone in the city $G_i$ uses the one-touch call platform on his mobile intelligent terminal $C_{n_i}(t)$ in the city $G_j$ to call an emergency rescue department located in where he is in: $G_{j1}$ (110 public security), $G_{j2}$ (119 fire alarm), $G_{j3}$ (120 medical care), $G_{j4}$ (122 traffic), $G_{j5}$ (government emergency office), $G_{j6}$ (social rescue organization), $G_{j7}$ (rescue company with number starting with 400), . . . , $G_{jM}$ (other emergency rescue number), etc., the algorithm of the "one-touch call" platform is as follows:

(1) Step 1: User $B_{n_i}(t)$ opens the mobile intelligent terminal $C_{n_i}(t)$ (2) Step 2: User $B_{n_i}(t)$ opens the one-touch call platform on the mobile intelligent terminal $C_{n_i}(t)$ (3) Step 3: Button selection The user $B_{n_i}(t)$ selects a function button of the "one-touch call" platform in accordance to the current risk, such as $G_{j1}$, $G_{j2}$, $G_{j3}$, $G_{j4}$, $G_{j5}$, $G_{j6}$, $G_{j7}$, . . . , $G_{jM}$. However, multiple different buttons can be selected in order according to the specific situation, but the second button must be selected after the call corresponding to the previous button is completed. And so on.

(4) Step 4: One-touch call

According to the choice of step (3), suppose that the function button selected by the user $B_{n_i}(t)$ on the one-touch call platform is $G_{jk}$ (k=1, 2, 3, 4, 5, 6, 7, . . . , M), then ① if j=i, the user makes a one-touch calling to an emergency rescue department in the local area $G_i$ such as 110 (public security), 119 (fire alarm), 120 (medical care), 122 (traffic), government emergency offices, social rescue organizations, rescue companies with numbers starting with 400, . . . , and other emergency rescue departments, etc., by the "one-touch calling" platform. As long as the user clicks these buttons, one-touch call to the corresponding emergency rescue department may be achieved;

② if j≠i, i, j=1, 2, . . . , N, the user makes a one-touch calling to an emergency rescue department of the remote area $G_j$ such as 110 (public security), 119 (fire alarm), 120 (medical care), 122 (traffic), government emergency offices, social rescue organizations, rescue companies with numbers starting with 400, . . . , and other emergency rescue departments, etc. As long as the user clicks these buttons, one-touch call to the corresponding emergency rescue department may be achieved (5) Step 5: Automatic message sending According to the choice of step (4), suppose that the function button selected by the user $B_{n_i}(t)$ on the "one-touch dial" platform is $G_{jk}$ (k=1, 2, 3, 4, 5, 6, 7, . . . , M), then ① if j=i (i, j=1, 2, . . . , N), the user makes a one-touch calling to an emergency rescue department in the local area $G_i$ such as 110 (public security), 119 (fire alarm), 120 (medical care), 122 (traffic), government emergency offices, social rescue organizations, rescue companies with numbers starting with 400, . . . , and other emergency rescue departments, etc., by the "one-touch calling" platform. Then the backend system of the "one-touch call" platform automatically calls the map function principle between the local call-based user and the number of an emergency rescue department in Section 3.2.1 and the principle of message sending when making a local call in Section 3.3.1, and the user's personal information (the person calling for alarm, and time, mobile phone number and address of the alarm) and location in a map is sent to the preset contacts by messages when an emergency department of the local area $G_i$ is called.

②if j≠i (i, j=1, 2, . . . , N), the user makes a one-touch calling to an emergency rescue department in the local area $G_i$ such as 110 (public security), 119 (fire alarm), 120 (medical care), 122 (traffic), government emergency offices, social rescue organizations, rescue companies with numbers starting with 400, . . . , and other emergency rescue departments, etc., by the "one-touch calling" platform. Then the backend system of the "one-touch call" platform automatically calls the map function principle between the remote call-based user and the number of an emergency rescue department and the principle of message sending when making a local call, and the user's personal information (the person calling for alarm, and time, mobile phone number and address of the alarm) and location in a map is sent to the preset contacts by messages when an emergency department of the local area $G_i$ is called.

(6) Step 6: Reselection of the button and ending

After the user selects a prior function button on the one-touch call platform to make a one-touch call, the user can re-select a new function button on the platform to make another one-touch call. When the user decides to re-select a new function button to make a one-touch call on the "one-touch call" platform, the algorithm returns to step 3. When the user decides not to select a new function button for one-touch call, the algorithm ends.

The implementation method of the one-touch call platform based on a mobile intelligent terminal includes the following steps:
(1) automatically reading an electronic map by the mobile intelligent terminal to obtain the current location of the user and a real-time map, the user's name, mobile phone number and location being saved in the backend memory;
(2) automatically reading GPS by the mobile intelligent terminal to obtain the administrative area code of the current location of the user, and converting the administrative area code into a corresponding area code by a backend data converter to obtain an identification number;
(3) calling the identification number by a front-end data trigger and receiving the identification number by a front-end data receiver;
(4) sending the identification number from the front-end data receiver to a backend data processor;
(5) combining the identification number and a preset emergency rescue landline telephone number of a button by the backend data processor;
(6) calling a target number through the built-in telephone dialer in the backend system to realize one-touch calling; and
(7) when one-touch calling is made to the target number, sending the user's name, mobile phone number and location automatically to the contact preset in the "one-touch calling" platform by a message.

More specifically, when the user encounters an emergency and needs help, for example, the user encounters a gangster and needs help from 110: the user experience sudden high blood pressure or heart disease and requires help from 120: the user's house is on fire and requires help from 119: the user encounters travel accident and needs help from 122; and the user encounters with natural disasters or accidents and needs help from government emergency offices, social rescue organizations, rescue company with number starting with 400 and other emergency rescue departments, he can immediately enter the "one-touch call" platform on his mobile phone, and make a one-touch call to 110 (public security), 119 (fire), 120 (medical), 122 (traffic), government emergency offices, social rescue organization, rescue company with number starting with 400 and other emergency rescue departments, etc., wherein the one-touch call to "110" can achieve "one-touch alarm". Assuming that the user's mobile intelligent terminal has downloaded an electronic map and GPS, the technical principle and algorithm steps of the "one-touch call" are as follows:

Step 1: The user opens the mobile intelligent terminal.

Step 2: A GPS data reading center reads the administrative area code of the city (region) where the user is located through the GPS interface.

Step 3: The GPS data reading center transmits the read administrative area code of the city (region) where the user is located to the backend data converter.

Step 4: The backend data converter converts the administrative area code into an area code corresponding to the city (region), and then saves it to the first backend memory.

Step 5: At the same time, an electronic map data reading center reads the current location of the user and the latitude and longitude of the real-time map through an electronic map interface.

Step 6: The electronic map data reading center stores the current location of the user and the latitude and longitude of the real-time map to the second backend memory.

Step 7: When the user logs in to the one-touch call platform on the mobile intelligent terminal, the user can click any button corresponding to an emergency rescue department shown on the front end of the one-touch call platform according to his need. As mentioned above, buttons corresponding to emergency rescue departments shown on the front end of the one-touch call platform include: 110 (public security), 119 (fire), 120 (medical care), 122 (traffic), government emergency office, social rescue organization, rescue company with number starting with 400 and other emergency rescue departments, and below is the same:

Step 8: At this time, the one-touch call platform performs two tasks simultaneously:
(1) The first task is as follows:
① when a first front-end data receiver receives the preset phone number of the button, transmitting the preset phone number to the first backend data processor;
② after a first front-end data trigger is triggered, notifying a first backend data caller to call the area code in the first backend memory by the first front-end data trigger;
③ transmitting the area code to the first backend memory by the first backend data caller;
④ after the first backend memory contains both the city or regional area code and the preset phone number of the button, combining the area code and the preset phone number to form an "area code+phone number";
⑤ transmitting the "area code+phone number" to the telephone dialer by the backend memory;
⑥ dialing the "area code+phone number" through one-touch calling by the telephone dialer:
(2) The second task carried out simultaneously by the one-touch call platform is as follows:

①  after a second front-end data trigger is triggered, notifying a second backend data caller to call the user's name and mobile phone number in the first backend memory, and simultaneously call the current location of the user and the latitude and longitude of the real-time map in the second backend memory;

② sending the user's name, mobile phone number, and current location, latitude and longitude of the real-time map and the real-time map to the message sending module by the second backend data caller;

③ sending the user's name, mobile phone number, and current location, computer system time, latitude and longitude of the real-time map and the real-time map to the emergency contact (preset in the backend of the one-touch call platform) by the message sending module; if the user makes "one-touch call" to 110, the message sending platform sends the following to the emergency contact: the person calling for alarm, time and mobile phone number of the alarm, the address of the current location and the real-time map, thereby realizing the "one-touch alarm".

Step 9: If the user no longer makes a call, the algorithm ends; otherwise, return to the second step of the algorithm and continue to execute from top to bottom in order.

Figure 8:
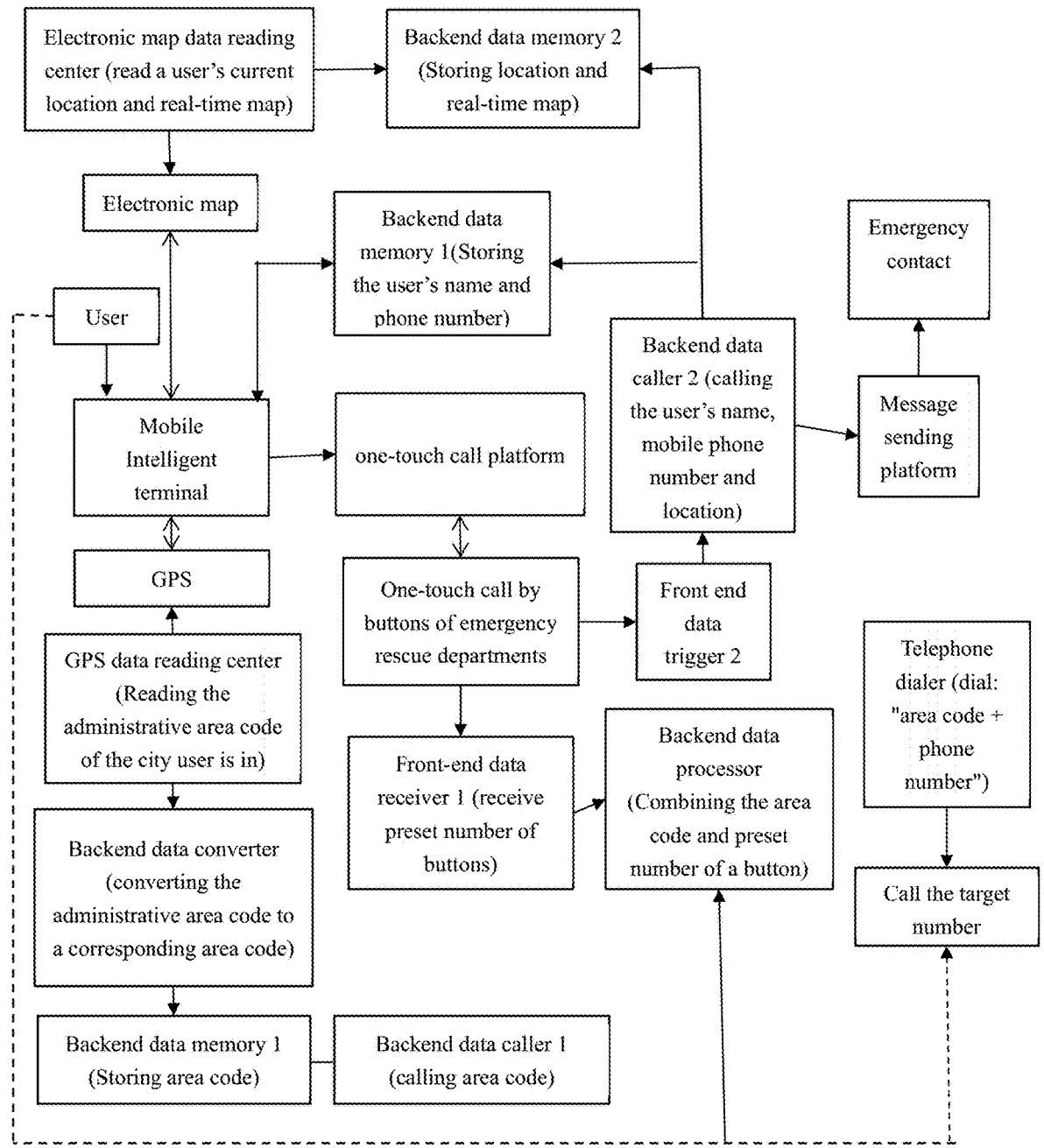
FIG. 8 is a flow chart of the method for the "one-touch call" platform of the invention.

FIG. 8 is the execution flow of the "one-touch call" platform algorithm, in which the double arrows refers to that: (1) "GPS" and "electronic map" are built into the mobile intelligent terminal: (2) The "one-touch call" platform display page has been designed with buttons corresponding to emergency rescue departments' telephone number: (3) The mobile intelligent terminal has stored the user's name and mobile phone number in the first backend memory.

The above embodiments are preferred embodiments of the present invention, but the embodiments of the invention are not limited to the above embodiments. Those any other changes, modifications, substitutions, combinations, and simplifications made without departing from the spirit and scope of the invention should all be equivalent replacements and are included in the scope of the invention.

The invention claimed is:

1. A one-touch call platform based on a mobile intelligent terminal, characterized by comprising a one-touch call from and to a local calling area module, a one-touch call from and to a remote calling area module and a message sending module; wherein the one-touch call from and to the local calling area module is configured to call an emergency rescue department of the local calling area correspondingly by a function button of a one-touch call platform on the mobile intelligent terminal after the mobile intelligent terminal receives a trigger instruction of the one-touch call, when a mobile phone associated with the mobile intelligent terminal is registered in the local calling area;

the one-touch call from and to a remote calling area module is configured to call an emergency rescue department of the remote calling area correspondingly by the function button of the one-touch call platform on the mobile intelligent terminal after the mobile intelligent terminal receives the trigger instruction of the one-touch call, when the mobile phone associated with the mobile intelligent terminal is registered in the local calling area, and the user thereof roams to the remote calling area; and the message sending module is configured to automatically and simultaneously send a message to a contact when the one-touch call platform on the mobile intelligent terminal makes the call; and the one-touch call from and to a remote calling area module is configured by a polysemy function, wherein: the polysemy function $f_k(t)$ is:

$$f_k(t): B_{n_i}(t) \to G_{ik} \to m_j + \text{the phone number corresponding to number } k$$

wherein, k=1, 2, 3, 4, 5, 6, 7, ..., M, $G_{ik}$ refers to calling the $k^{th}$ emergency rescue department of a remote area $G_j$ from the city $G_i$ where the user registers the mobile intelligent terminal.

2. The one-touch call platform based on a mobile intelligent terminal according to claim 1, characterized in that, the one-touch call from and to the local calling area module is configured by multi-layer mapping, wherein:

given that there are S buttons corresponding to various emergency rescue departments' telephone numbers on the one-touch call platform: $G_{i1}, G_{i2}, G_{i3}, G_{i4}, G_{i5}, G_{i6}, G_{i7}, \ldots, G_{iS}$ when a user $B_{n_i}(t)$ calls a local emergency rescue department of the city $G_i$ where the user registers the mobile intelligent terminal, that is, the user $B_{n_i}(t)$ clicks the button $G_{i1}, G_{i2}, G_{i3}, G_{i4}, G_{i5}, G_{i6}, G_{i7}, \ldots, G_{iS}$ of the one-touch call platform on the mobile intelligent terminal to achieve one-touch call, and the mapping relationship of the established mathematical function $f_k$ is:

$$f_k: t \to B_{n_i}(t) \to G_{ik} \to \text{the phone number corresponding to number } k$$

wherein, $f_k$ is multi-layer mapping, k=1, 2, 3, 4, 5, 6, 7, ..., S.

3. The one-touch call platform based on a mobile intelligent terminal according to claim 1, characterized in that, the one-touch call from and to a local calling area module is configured by a polysemy function, wherein:

when a user $B_{n_i}(t)$ calls a local emergency rescue department of the city $G_i$ where the user registers the mobile intelligent terminal, that is, the user $B_{n_i}(t)$ clicks the button $G_{i1}, G_{i2}, G_{i3}, G_{i4}, G_{i5}, G_{i6}, G_{i7}, \ldots, G_{iS}$ of the one-touch call platform on the mobile intelligent terminal to achieve one-touch call, the mapping relationship of the established polysemy function $f_k$ is:

$$f_k: t \to B_{n_i}(t) \to G_{ik} \to \text{the phone number corresponding to number } k$$

wherein, $f_k$ is the polysemy function, k=1, 2, 3, 4, 5, 6, 7, ..., S.

4. The one-touch call platform based on a mobile intelligent terminal according to claim 1, characterized in that, the message sending module comprises a contact setup module, an automatically and simultaneously sending message from a local number module, and an automatically and simultaneously sending message from a remote number module; wherein the contact setup module is configured to preset the contact and add information of the contact, the information of the contact comprising a name, a relationship and a mobile phone number;

the automatically and simultaneously sending message from a local number module is configured to send personal information and location to the preset contact in a message by the platform automatically and simultaneously when a one-touch call is made to call an emergency rescue department of a local area $G_i$ by a function button of the "one-touch call" platform on a mobile intelligent terminal $C_{n_i}(t)$ associated with the mobile phone registered in the city $G_i$, the personal information comprising the person calling for alarm, and time, mobile phone number and address of the alarm;

the automatically and simultaneously sending message from a remote number module is configured to send personal information and location to the preset contact in a message by the platform automatically and simultaneously when a remote one-touch call is made by a function button of the one-touch call platform on the mobile intelligent terminal $C_{n_i}(t)$ associated with the mobile phone registered in the city $G_i$ after roaming to a remote area $G_j$, the personal information comprising the person calling for alarm, and time, mobile phone number and address of the alarm.

5. The one-touch call platform based on a mobile intelligent terminal according to claim 4, characterized in that, when the automatically and simultaneously sending message from a local number module and the automatically and simultaneously sending message from a remote number module send a message:

given that a user $B_{n_i}(t)$ selects a function button $G_{ik}$, k=1, 2, 3, 4, 5, 6, 7, ..., M on the "one-touch call" platform, ①if j=i, the user makes a one-touch call to an emergency rescue department in the local area $G_i$ by the "one-touch call" platform, and the backend of the one-touch call platform sends a message to the contact through the automatically and simultaneously sending message from a local number module utilizing a mapping function between the one-touch call from and to a local calling area module and the phone number of the emergency rescue department, wherein the personal information and the location of the user are sent to the preset contact in a message simultaneously when the one-touch call to the local emergency rescue department $G_i$ is made;

②if j≠i, i, j=1, 2, ..., N, the user makes a one-touch call to an emergency rescue department of the remote area $G_j$ by the one-touch call platform, and the backend of the one-touch call platform sends a message to the contact through the automatically and simultaneously sending message from a remote number module utilizing a mapping function between the one-touch call from and to a remote calling area module and the phone number of the emergency rescue department, wherein the personal information and the location of the user are sent to the preset contact in a message simultaneously when the one-touch call to the remote emergency rescue department $G_i$ is made.

6. A method for implementing the one-touch call platform based on a mobile intelligent terminal according to claim 1, characterized by comprising the following steps:

automatically reading an electronic map by the mobile intelligent terminal to obtain the current location of the user and a real-time map, the user's name, mobile phone number and location being saved in the backend memory;

automatically reading GPS by the mobile intelligent terminal to obtain the administrative area code of the current location of the user;

converting the administrative area code into a corresponding area code by a backend data converter to obtain an identification number;

calling the identification number by a front-end data trigger and receiving the identification number by a front-end data receiver;

sending the identification number from the front-end data receiver to a backend data processor;

reading the current location of the user and the latitude and longitude of the real-time map by an electronic map data reading center through an electronic map interface;

combining the identification number and a preset emergency rescue landline telephone number of a button by the backend data processor;

calling a target number through the built-in telephone dialer in the backend system to realize one-touch call; and when one-touch call is made to the target number, sending the user's name, mobile phone number and location automatically to the contact preset in the "one-touch call" platform by a message.

7. The method according to claim 6, characterized in that, the backend memory comprises a first backend memory and a second backend memory; wherein a backend data converter converts the administrative area code to the area code corresponding to the city (region), and saves the area code in the first backend memory;

the electronic map data reading center saves the current location of the user and the latitude and longitude of the real-time map in the second backend memory.

8. The method according to claim 7, characterized by further comprising the following two steps when one-touch call is made to the target number:

the first step is as follows:

when a first front-end data receiver receives the preset phone number of the button, transmitting the preset phone number to the first backend data processor;

after a first front-end data trigger is triggered, notifying a first backend data caller to call the area code in the first backend memory by the first front-end data trigger;

transmitting the area code to the first backend memory by the first backend data caller;

after the first backend memory contains both the city or regional area code and the preset phone number of the button, combining the area code and the preset phone number to form an area code+phone number;

transmitting the "area code+phone number" to the telephone dialer by the backend memory;

dialing the area code+phone number through one-touch call by the telephone dialer; and the second step is as follows:

after a second front-end data trigger is triggered, notifying a second backend data caller to call the user's name and mobile phone number in the first backend memory, and simultaneously call the current location of the user and the latitude and longitude of the real-time map in the second backend memory;

sending the user's name, mobile phone number, and current location, latitude and longitude of the real-time map and the real-time map to the message sending module by the second backend data caller;

sending the user's name, mobile phone number, and current location, computer system time, latitude and longitude of the real-time map and the real-time map to the emergency contact by the message sending module.

9. The method according to claim 7, characterized in that, when the one-touch call platform on the mobile intelligent terminal is working, the user may click any one button corresponding to an emergency rescue department's phone number displayed on the one-touch call platform according to the user's need.

* * * * *